No. 776,181. PATENTED NOV. 29, 1904.
J. E. HOSMER.
FOLDABLE AND PORTABLE CHART.
APPLICATION FILED FEB. 13, 1904.
NO MODEL. 2 SHEETS—SHEET 1.

Witnesses
Elmer Seavey
Geo. A. Hawkins

Inventor
John E. Hosmer
by Henry N. Copp
his Attorney

No. 776,181. PATENTED NOV. 29, 1904.
J. E. HOSMER.
FOLDABLE AND PORTABLE CHART.
APPLICATION FILED FEB. 13, 1904.
NO MODEL. 2 SHEETS—SHEET 2.
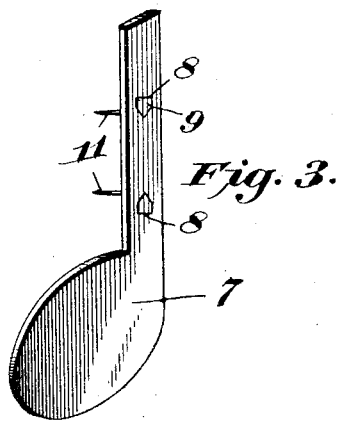
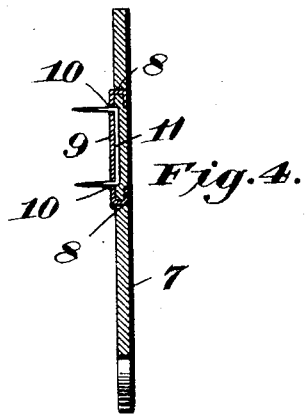
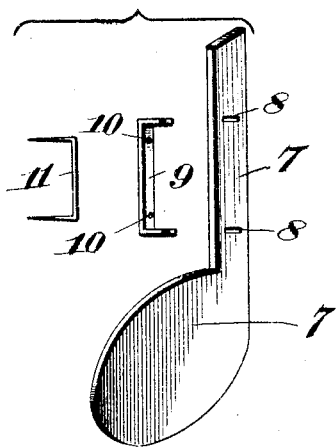

No. 776,181.                                    Patented November 29, 1904.

UNITED STATES PATENT OFFICE.

JOHN E. HOSMER, OF SILVERTON, OREGON.

FOLDABLE AND PORTABLE CHART.

SPECIFICATION forming part of Letters Patent No. 776,181, dated November 29, 1904.

Application filed February 13, 1904. Serial No. 193,426. (No model.)

*To all whom it may concern:*

Be it known that I, JOHN E. HOSMER, a citizen of the United States, residing at Silverton, county of Marion, and State of Oregon, have invented certain new and useful Improvements in Foldable and Portable Charts, of which the following is a specification.

This invention relates to foldable and portable charts, and more especially to that class of charts which have removable characters adapted to be placed on either side.

The object of this invention is to simplify the teaching of music, reading, spelling, mathematical problems, &c. Further, the chart is adapted to teach other studies wherein characters or other *indicia* may be placed upon the chart so as to be visible to a number of pupils.

The invention consists in a rectangular frame having adjustable parts and a canvas stretched thereupon and adapted to receive indicating characters to indicate a piece of music, a problem or sentence, or even the letters of the alphabet.

It further consists in special means for retaining the characters on the chart.

It further consists in a case for containing these characters; and it further consists in the combination of parts and novel advantages which will be hereinafter more clearly set forth, and pointed out in the appended claims.

Figure 1:
Figure 2:
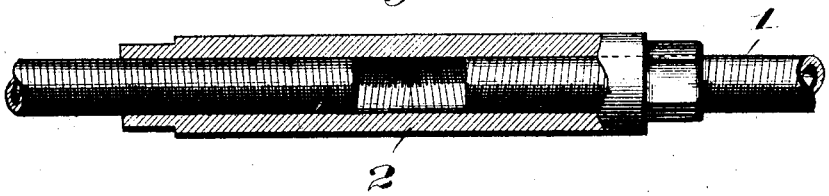

In the drawings, Figure 1 is a perspective view of the chart with a plurality of characters attached thereto. Fig. 2 is a detail of the turnbuckle for adjusting chart. Fig. 3 is a detail perspective of one of the characters. Fig. 4 is a longitudinal section of one of the characters, showing means for attaching same. Fig. 5 is a detail view of the several parts separated, showing their relative position when unassembled. Fig. 6 is a detail perspective of the hook for attaching the chart to the frame.

Referring more especially to the drawings, 1 is a rectangular frame having turnbuckles 2 centrally disposed on each side and end thereof and so arranged as to extend the frame in either direction.

3 represents the canvas, which is provided with a series of apertures 4, having eyelets 5, which are adapted to receive the hooks 6, which engage said apertures and which are slidably mounted upon the frame 1. This canvas 3 is double-sided and is adapted to receive the different characters on either side. One side, such as is shown in Fig. 1, may be ruled with five lines and four spaces for a musical chart. The opposite side may be unruled or may have lines for sentences. In fact, almost any kind of character may be attached to the chart by the novel fastening means which will hereinafter be described.

In Figs. 3, 4, and 5 I have shown my preferred construction of character, in which 7 represents the body thereof having apertures 8, through which a metallic band 9 is passed and clenched on the opposite side, as shown in Fig. 3. This metallic band 9 is provided with apertures 10, through which a sharply-pointed staple 11 is adapted to pass and be held in engagement with the body of the character by the pressure exerted in clenching the band 9. This sharp-pointed staple is adapted to be forced into the meshes of the canvas, and said canvas being stretched the characters are held thereon by the inherent friction of the meshes exerted upon the staples. Thus it will be seen that these characters may be placed upon the chart, removed at will, and placed in a different position, which would enable the teacher or operator to change from one piece of music or one sentence or any given number of numerals or characters to any change which he might wish to make. The frame is provided at 12 with elbow-joints and at 13 with T-joints, which latter are adapted to removably connect with standards 14. Intermediate of the length between the joints 12 and 13 on either side or ends and the turnbuckles 2 there could be placed any sort of suitable connection which could be disengaged rapidly, so that the frame could be folded up into a small compass. The hooks which engage the frame and the eyelets in the canvas may be readily slipped from the frame after the joints are disengaged and folded up and placed within any suitable case for transportation.

I have herein shown the characters to be made of leather; but this may be varied, and characters of tin, celluloid, or some other semiflexible material may be employed without materially altering the scope of the invention.

I am well aware of the fact that charts have been made with detachable letters; but so clumsily and illy associated were the parts that it was impossible to carry them around with any ease, and I therefore do not claim, broadly, a chart with removable characters.

Having thus described my invention, what I claim as new, and desire to secure by Letters Patent, is—

1. In a device of the class described, the combination with a rigid frame, of a chart of flexible material, mechanical means detachably securing the chart to the frame, and characters having fastening means whereby they can be engaged with the chart at any desired point.

2. In a device of the class described, the combination with a rigid frame having means for its adjustment to different sizes, of a chart of flexible material, mechanical means detachably securing said chart to said frame, and characters having fastening means whereby they can be engaged with any part of said chart.

3. In a device of the class described, the combination with supports, of a frame removably secured thereto, turnbuckles for adjusting said frame, a flexible and foldable chart, means detachably securing the chart to the frame, and characters adapted to be removably secured to any part of said chart.

4. In a device of the class described, the combination with supports, of a frame removably secured to said supports, turnbuckles carried by said frame for adjusting it to different sizes, a flexible and foldable chart, a hooked member detachably securing the chart to said frame, and characters adapted to be removably secured to any part of the chart.

In testimony whereof I hereunto affix my signature in presence of two witnesses.

JOHN E. HOSMER.

Witnesses:
   H. E. BROWNE,
   G. W. HUBBS.